United States Patent
Tegtmeyer et al.

(10) Patent No.: US 10,621,498 B1
(45) Date of Patent: Apr. 14, 2020

(54) PREDICTIVE PROJECT SATURATION DECISION MAKING PROCESS

(71) Applicant: United Services Automobile Association, San Antonio, TX (US)

(72) Inventors: Joseph R. Tegtmeyer, Bulverde, TX (US); Russell E. Williams, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 814 days.

(21) Appl. No.: 14/825,980

(22) Filed: Aug. 13, 2015

Related U.S. Application Data

(60) Provisional application No. 62/048,087, filed on Sep. 9, 2014.

(51) Int. Cl.
*G06N 5/04* (2006.01)

(52) U.S. Cl.
CPC .................................... *G06N 5/048* (2013.01)

(58) Field of Classification Search
CPC ........ G06N 5/048; G06N 5/025; G06Q 10/06; G06Q 10/0631; G06Q 10/06311; G06Q 10/063114; G06Q 10/06312; G06Q 10/06313; G06Q 10/0633; G06Q 10/0635
USPC .......................................................... 706/52
See application file for complete search history.

(56) References Cited

U.S. PATENT DOCUMENTS

| | | | |
|---|---|---|---|
| 8,626,698 B1 * | 1/2014 | Nikolaev | G06Q 10/06393 705/7.17 |
| 2005/0234697 A1 * | 10/2005 | Pinto | G06Q 10/06 703/22 |
| 2008/0255910 A1 * | 10/2008 | Bagchi | G06Q 10/06 705/7.28 |
| 2011/0125547 A1 * | 5/2011 | Brdiczka | G06Q 10/06 705/7.26 |
| 2013/0325763 A1 * | 12/2013 | Cantor | G06Q 10/0633 706/12 |
| 2014/0288991 A1 * | 9/2014 | Strong | G06Q 10/06313 705/7.23 |

* cited by examiner

*Primary Examiner* — Dave Misir
(74) *Attorney, Agent, or Firm* — Locke Lord LLP; Christopher J. Capelli

(57) ABSTRACT

A method for generating a project saturation model for one or more projects is provided. Historical project data is analyzed to define a plurality of project change factors for one or more proposed projects. A plurality of scoring values associated with the plurality of project change factors is received for each of the one or more proposed projects. One or more saturation model components are generated based on the historical project data and based on the received plurality of scoring values for each of the proposed projects. A saturation model is generated by combining the saturation model components for each of the proposed projects. The saturation model identifies risks associated with a corresponding project.

4 Claims, 6 Drawing Sheets

| Project Change Factor | Score |
|---|---|
| Organizational structure | 3 |
| Recruiting, staffing, retention | 1 |
| Management restructuring | 3 |
| Skill sets and/or capabilities impact | 2 |
| Performance Management | 5 |
| Doctrine, strategy, core beliefs or culture | 2 |
| Process and/or procedures | 4 |
| IT and/or material solution | 5 |
| Facilities | 4 |

FIG. 2

PREDICTIVE PROJECT SATURATION DECISION MAKING PROCESS

CROSS REFERENCE TO RELATED APPLICATIONS

This application claims priority to U.S. Patent Application Ser. No. 62/048,087 filed Sep. 9, 2014 which is incorporated herein by reference in its entirety.

FIELD OF THE INVENTION

The present technology relates to the field of project management, and more particularly, to utilizing a predictive project saturation decision making process.

BACKGROUND OF THE INVENTION

Project managers are responsible for successfully completing projects and achieving project objectives notwithstanding many risks which may threaten to disrupt project execution. A risk may be anything which is not currently confirmed but has the potential to negatively affect a project schedule, cost, functional scope, and/or quality. Evaluating and coping with risks is difficult, particularly when project managers quantify risks differently and associate different levels of concern with the same quantified risk. Often risks are not addressed until the steps to mitigate the risks require greater resource allocation. Insufficiently mitigated risks can develop into problems that negatively impact other projects. Furthermore, risks change over time, such that a project manager may continue to invest significant resources mitigating a risk even after the risk has diminished in criticality. The project manager's director may be unaware of the changing risks for the project and the project manager's inefficient use of resources.

Traditionally, project approval and management within a company or organization is focused primarily on resource availability and timing. However, this project approval process fails to consider the level and degree of disruption on the organization as a result of the cumulative and inter-related number of changes project implementation causes and the ability of employees to adopt and adapt to these changes as they occur.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a computer-implemented method for generating a project saturation model for one or more projects is provided. Historical project data is captured and analyzed to define a plurality of project change factors for one or more proposed projects. A plurality of scoring values associated with the plurality of project change factors is received for each of the one or more proposed projects. One or more saturation model components are generated based on the historical project data and based on the received plurality of scoring values for each of the proposed projects. A saturation model is generated by combining the saturation model components for each of the proposed projects. The saturation model identifies risks associated with a corresponding project.

In another aspect, a computer program product for generating a project saturation model for one or more projects is provided. The computer program product comprises one or more computer-readable storage devices and a plurality of program instructions stored on at least one of the one or more computer-readable storage devices. The plurality of program instructions includes program instructions to analyze historical project data to define a plurality of project change factors for one or more proposed projects. The plurality of program instructions further includes program instructions to receive a plurality of scoring values associated with the plurality of project change factors for each of the one or more proposed projects. The plurality of program instructions further includes program instructions to generate one or more saturation model components based on the historical project data and the received plurality of scoring values for each of the one or more proposed projects. The plurality of program instructions further includes program instructions to generate a saturation model by combining the one or more saturation model components for each of the one or more proposed projects. The saturation model identifies risks associated with a corresponding project.

BRIEF DESCRIPTION OF THE DRAWINGS

So that those having ordinary skill in the art, to which the present embodiments pertain, will more readily understand how to employ the novel system and methods, certain illustrated embodiments thereof will be described in detail herein-below with reference to the following drawings.

FIG. 2 shows a completed project change factor worksheet in accordance with the exemplary embodiment.

DETAILED DESCRIPTION OF CERTAIN EMBODIMENTS

Figure 1:
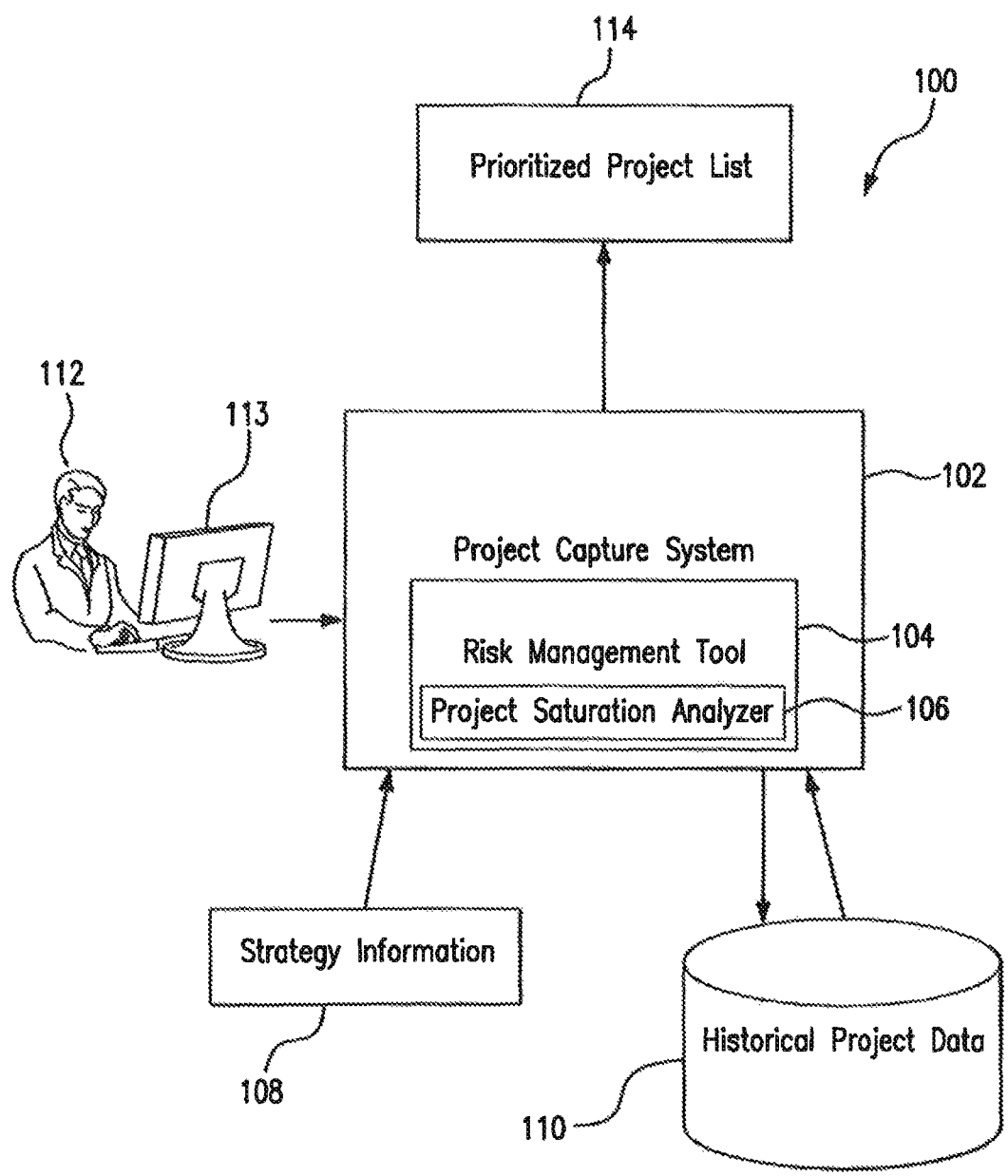
FIG. 1 is a schematic illustration of an integrated project risk management system in accordance with an exemplary embodiment.

It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and the illustrated embodiments and processes may be implemented in any order and/or combination that are practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the certain embodiments described herein. Thus the certain embodiments are not to be understood to be limited by what has been particularly shown and described, except as indicated by the appended claims.

In embodiments of the present disclosure, system, computer program product and method are provided for risk management in project management. Typically, a project may pass through a number of phases, such as a concept phase, an analysis phase, a design phase, a development phase, a testing phase, and a launch phase. The cycle time for the project may be defined as the length of time it takes for the project to pass through all project phases. The ability to predict the cycle time for a project may be useful for planning purposes (i.e., allocating the necessary resources for a particular phase). Cycle time may be determined as a function of a number of factors, including estimated project costs, the length of time needed for project analysis, the associated testing plan, organizational participation in the project, the number of applications impacted, and the pre-existing status of the project.

A risk management tool is disclosed that initially identifies risks during the concept phase, in contrast to the standard practice of identifying risks during the analysis phase or later. Project managers tend to identify risks during the analysis phase because of the perception that risks cannot be as accurately identified or analyzed during the earlier concept phase when the project is less defined. However, identifying risks during the concept phase enables project managers to begin taking actions to mitigate the risks at an earlier phase when the actions may require significantly less resources. Furthermore, the risk management tool may continue identifying risks associated with project saturation during each phase of project management. By identifying project saturation risks during each phase, the risk management tool enables the execution of proportional mitigation actions, such as allocating more resources to mitigate a project saturation risk with an escalating probability and allocating fewer resources to mitigate a risk with reducing severity of impact. Moreover, by identifying risks during each phase, the risk management tool enables identification of risks that did not exist and/or were erroneously estimated during earlier phases of project management.

Typically, organizations have no uniform way of measuring the impact of employee saturation. Thus, it is difficult for an organization to determine how to make the link between change management and employee saturation more tangible; and how behavior change requirements are truly impacting business results. Failure to account for employee saturation during the concept phase, which may include planning and resource allocation processes, typically may lead to diminished return on investment (ROI), reduced or ineffective adoption of required new capabilities to maintain a competitive advantage which, in turn, may lead to reduced customer satisfaction. For purposes of describing various embodiments of the present invention, the term "saturation" generally refers to the mental process characterized by information absorption rate and information absorption capacity. The present inventors have discovered that it is possible to quantify the working capacity of the brain in very much the same way in which the working capacity of the heart is determined when measuring the physical fitness based on oxygen consumption during various degrees of physical exercise. A further finding is that the working capacity of the brain is reflected in overall performance of a person. In other words, when estimated capacity for cognitive and psychological workload of a particular person exceeds a threshold value, that person's productivity is typically reduced. It will be understood the term "project saturation," as used herein with respect to resources allocated to a particular project, is intended to refer to the range of individual's abilities to continue to perform, maintain an acceptable level of productivity, incorporate behavior changes and adopt new methodologies and capabilities.

The project management system disclosed herein includes processes and systems for improving long-range planning and quantifying the link between resource allocation decision-making and identified risks associated with employee saturation. Instead of each project manager identifying and analyzing risks for their own projects according to their own subjective criteria, various embodiments of the present invention provide project managers a predictive project saturation tool having a scalable and pluggable framework and method for automated, cost effective project risk identification and measurement. In a preferred embodiment, this tool can be readily integrated with existing project management systems and takes advantage of data from historical projects. Forecasting information provided by the project saturation tool described herein enable the manager of the large project to take action in a timely manner shortly after information about other projects change, rather than waiting for reports about other projects when the other projects meet various milestones, thus improving a cumulative strategic development process.

Referring now to the drawings, and more particularly to FIG. 1, there is shown a system level diagram that identifies elements of the integrated project risk management system 100. Its major elements include a project capture system 102 that allows resource sharing and allocation across multiple projects and enables monitoring and managing projects/programs/resources. A risk management tool 104 may be a software component that allows planning based on historical risk impact data and/or expert opinion data. In the preferred embodiment, a project saturation analyzer module 106 may be a software component that implements functionality corresponding to the project saturation model and that allows for learning from the historical employee performances and from cumulative planned activities among different projects by providing a technique that associates employee saturation risk factors to specific activities and estimates their impact on activity durations and costs.

In the preferred embodiment illustrated in FIG. 1, the project risk management system 100 utilizes strategy information 108, provided, for example, by organization's strategy team, as an input to the aforementioned project saturation model. In some embodiments, the strategy team may work with operational level management to determine steps for implementing each operational strategy, and to determine measurable standards for cost, quality, and time for each project step. The strategy team may work with top level management to perform an analysis of the corporation's strengths, weaknesses, opportunities, and threats ("SWOT"), and to apply results of the SWOT analysis to determine strategic direction and strategic objectives. Working with top level management to determine the core requirements may include determining the core requirements based on the strategic direction and the strategic objectives. Formulating strategy for the corporation may include using a software tool to capture strategy-related information.

Various embodiments of the present invention contemplate that project saturation analyzer component 106 of the project capture system 102 may receive, via one or more computing devices, historical project data. Often an organization will retain data relating to projects that have been undertaken in the past. For example, an organization may retain information regarding project hard parameters (e.g., team composition, project timelines, the target and actual completion dates or the target and actual completion cost of the project), and project soft parameters (e.g., whether cross-selling opportunities were realized or whether the client was satisfied). This historical project data may be stored in a variety of ways, including, for example, still referring to FIG. 1, in historical project database 110, which may be stored, for example, on a storage device.

In addition, the project capture system 102 may obtain, via one or more computing devices 113, information associated with the one or more proposed projects that may be gathered by project managers/owners 112. The information may include cost information, project description, duration of the project or project schedule, as itemized or categorized into different tasks or phases, and project scope information. During various project phases, project leaders 112 (e.g., managers and/or employees in charge of projects) may be responsible for identifying target audience(s), assessing proposed projects using change impact scoring methodology described below and ensuring that various project information is accepted, evaluated and captured by the project capture system 102 while proposed projects are active.

According to an embodiment of the present invention risk management tool 104 may be configured to generate one or more outputs related to forecasting data. This forecasting data may be based on conclusions provided by the project saturation analyzer 106 and may be presented in graphs, reports or other output which reflect the correlations and predictions with respect to proposed projects. In one embodiment, such output may include a prioritized project list 114. Such prioritized project list 114 may further provide a prioritized list of tasks at the detailed level for each of the proposed projects that may be employed by task managers. In other words, the prioritized project list 114 may comprise a completed and approved master project list.

During the concept phase, project managers 112 may be responsible for assessing one or more proposed projects using various tools and methodologies. As mentioned above, project change data that may serve as one of the inputs utilized by risk management tool 104. In one embodiment, this project change data may be captured using a scoring model that categorizes complexity of the change via a plurality of project change factors. In this embodiment, project leaders 112 may complete one or more project estimation worksheets that may collectively provide project profile information for each of the proposed projects. A sample project estimation worksheet 200 that may be used to capture information related to project change factors is depicted in FIG. 2. This project estimation worksheet form 200 can be implemented as part of the integrated project risk management system 100, preferably using a computerized system or network. The project leader 112 should complete the project estimation worksheet 200 and provide it to the project capture system 102 in order to facilitate analysis performed by the project saturation analyzer 106.

According to an embodiment of the present invention, project estimation worksheet 200 may be a physical collection of one or more documents that may be completed manually. Additionally or alternatively, project estimation worksheet 200 may be an electronic document such as a spreadsheet or word-processor-generated document that may be completed by a project manager. Project-estimating worksheet 200 may include a list of questions or other entries for inputting information regarding one or more parameters (i.e. project change factors) of a new project that may be used in generating project saturation model for the new project. In one embodiment, scoring methodology may be used to capture this information. For example, project-estimating worksheet 200 may request information regarding one or more of the following: organizational structure and project resources 206; business processes and procedures implemented by the organization 208; information related to Information Technology (IT) and other infrastructure 210; and any other suitable information. In certain embodiments, a different project estimating worksheet may be generated for different types of projects. For example, a project estimating worksheet for a construction project may be different (at least in part) from a project estimating worksheet for a software development project.

As shown in FIG. 2, in addition to project change factor column 202 containing various categories of change factors, project estimating worksheet 200 may include a score column 204. In one embodiment score column 204 may contain metrics (e.g., impact scores) which may be assigned to each of the project changes factors 202 indicative of the potential effects of particular factors associated with the proposed project on the organization. According to an exemplary embodiment, the term "score" can be a number on a scale of 0-5 (0=lowest, 5=highest), wherein scores "0" and "1" represent no impact and very low impact, respectively, scores "2" and "3" represent low impact and medium impact and scores "4" and "5" are indicative of high and very high impacts. One of ordinary skill in the art will understand that other scales are also possible, e.g., 1-10. For example, a project leader may assign a medium score of "3" to the change factor associated with organizational structure if a proposed project is expected to introduce noticeable changes to task allocation, coordination and supervision and/or some realignment of key functions (with respect to a division, workgroup or individual) and if it may drive at least some personnel reporting or evaluation changes. The very low impact score of "1" assigned to the recruiting, staffing and retention factor may indicate that the proposed project is likely to introduce negligible to very small employee alignment effects if it is not expected to drive changes to recruitment or retention of employees and if it is likely to have minimal to superficial staffing requirement changes.

Continuing with the example in FIG. 2, low impact score of "2" assigned to the skill sets and/or capabilities change factor may be indicative of some restructure of employee abilities which may require some organized learning/training solutions and some time commitments. In other words, this project change may go beyond awareness to improved knowledge and may enact at least some behavior changes. With respect to the highly disruptive changes, a project manager may assign a very high impact score of "5", for example, to the performance management change factor if, for instance, the proposed project requires paradigm-changing comprehensive redesign and/or elimination of unit or individual metrics and performance requirements. This type of change typically would have very dramatic and permanent impacts with respect to human resources. Similarly, a high impact score of "4" may be assigned to the process and procedures change factor category if the proposed project requires comprehensive and permanent redesign of all processes and procedures. In other words, this type of score is indicative of fundamental changes to organization's operations. It should be understood that the description of project estimation worksheet 200 and specific examples of score assignments are intended for purposes of illustration only and are not intended to limit the scope of the present teachings.

Figure 3:
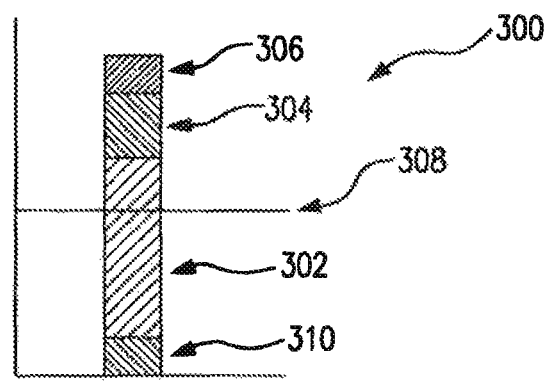
FIG. 3 illustrates a set of project saturation model components in accordance with an exemplary embodiment.

Turning to FIG. 3 now, illustrated therein is a set of project saturation model components in accordance with an exemplary embodiment. The set of project saturation model components may include, but is not limited to, project demand component 302, compounding component 304, mental change absorption capacity threshold component 308, above threshold component 306 and previous month carry over component 310. According to an embodiment of the present invention, project demand component 302 may be generated by the project saturation analyzer 106 based on the master project list 114 and based on the project estimation worksheet 200. In a preferred embodiment, the project demand component 302 is indicative of project complexity. The project demand component 302 may be derived by analyzing project profile and by comparing it to other planned initiatives in a given time period. Project saturation analyzer 106 may generate the compounding component 304 by taking into consideration project inefficiencies, overhead and limitations. One of ordinary skill in the art will understand that these inefficiencies and overhead compound as the number of projects grows. In other words the cumulative impact of the project demand components of a plurality of projects is greater than the sum of the individual project demand components. In a preferred embodiment, project saturation analyzer 106 may estimate the compounding component 304 based on analysis of historical project data 110 in relation to one or more proposed projects.

According to a preferred embodiment, the predetermined mental change absorption capacity threshold component 308 may comprise a threshold value reflective of information absorption capability of personnel. For example, project saturation analyzer 106 may estimate this value by analyzing team member profiles with respect to their capabilities, levels of adoption, acceptance and readiness based on various mental saturation factors in a given time period. The predetermined threshold component 308 represents a point of "diminishing returns" in that, at some point, further increases to the education and training of personnel do not produce a statistically significant increase in performance, and thus only serves to unnecessarily drain their mental change absorption capabilities. Further, project saturation analyzer 106 may generate the above threshold component 306 representative of project requirements, which may include, for example, a sum of a portion of the project demand component and the compounding component 408 that exceeds the predetermined mental change absorption capacity of personnel allocated to a given project in a given time period. It will be understood that above mental change absorption capacity threshold component 306 indicates further inefficiencies as personnel information absorption diminishes at a growing rate. According to a preferred embodiment of the present invention, the previous month carryover component 310 may indicate the amount of project demand component 302 and the compounding component 302 exceeding mental change absorption capacity threshold component 308 that may be carried over and serve as a shifted baseline from which the project demand component 302 extends the following month.

Figure 4:
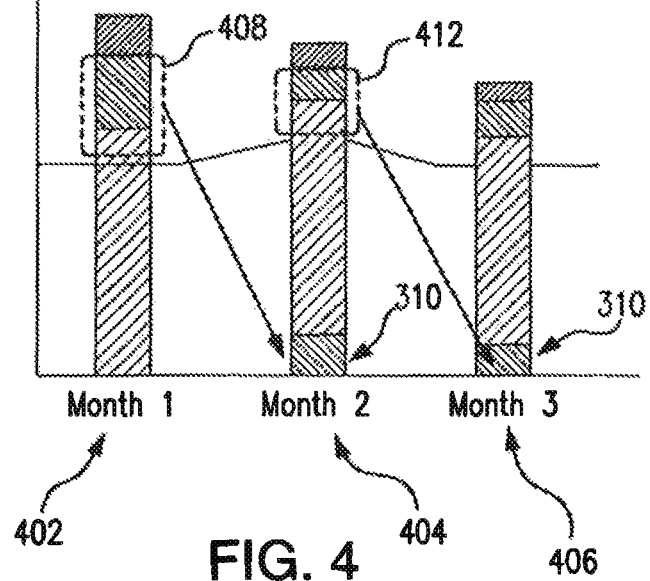
FIG. 4 illustrates the previous month carry over component of FIG. 3 in accordance with an exemplary embodiment.

FIG. 4 illustrates the previous month carry over component of FIG. 3 in accordance with an exemplary embodiment. When the predetermined time period for which project saturation analyzer 106 generates forecasting data exceeds one time period (e.g., one month), as explained above, at least a portion of the amount of project demand component 302 and the compounding component 302 that exceed the threshold component 306 may be used as a baseline for the following time period. For instance, FIG. 4 illustrates forecasting data output in a form of a bar graph generated by project saturation analyzer 106 for a three month period, more specifically, first month 402, second month 404 and third month 406. In this case, when generating the bar graph representing second month 404 project saturation analyzer 106 may use at least a portion of the sum of above threshold project demand component and compounding component 408 corresponding to the first month 402 as a baseline 310 for the bar graph representing second month 404. Similarly, when generating the bar graph representing project saturation for the third month 406 project saturation analyzer 106 may use at least a portion of the sum of above threshold project demand component and compounding component 412 corresponding to the second month 404 as a baseline 310 for the bar graph representing third month 406.

While, for purposes of simplicity of explanation, the methodology of saturation model operation of FIGS. 3 and 4 is shown and described as having 5 distinct components, it is to be understood and appreciated that the present invention is not limited by the illustrated model composition and order, as some aspects could, in accordance with the present invention, occur in different orders and/or concurrently with other components from that shown and described herein. Moreover, not all illustrated components may be required to implement a methodology in accordance with an aspect the present invention.

Figure 5:
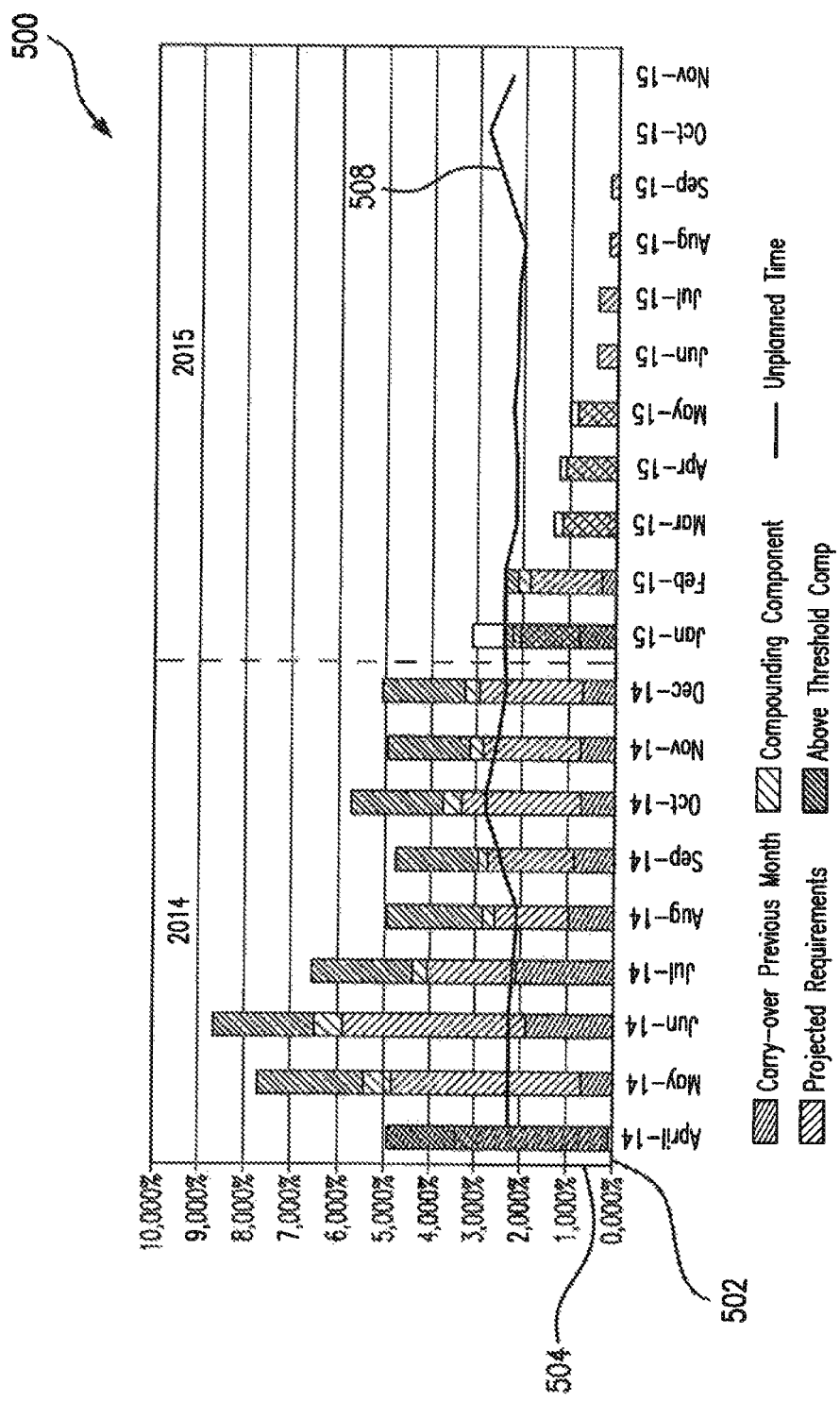
FIG. 5 illustrates an exemplary output feature of the disclosed project saturation model in accordance with an exemplary embodiment.

FIG. 5 further illustrates an exemplary output feature of the disclosed project saturation model in accordance with an exemplary embodiment. More specifically, FIG. 5 illustrates an exemplary bar graph 500 depicting the relationship of project saturation and time for a particular project and for the predetermined time period equal to two years, according to an embodiment of the present invention. The X-axis 502 represents the time; the Y-axis 504 represents project saturation In one embodiment, the time is measured in months. It is noted that the mental change absorption capacity threshold value of the project saturation model is represented by line 508. In one embodiment, project saturation analyzer 106 generates a saturation model by combining saturation model components shown in FIGS. 3 and 4.

Exemplary bar graph 500 permits project managers to analyze multiple project activity at varying levels of detail with respect to mental change absorption capacity threshold. For example, by looking at the bar graph 500, project managers may realize that there will not be enough "mental change absorption capacity" to successfully implement all projects in 2014. Exemplary bar graph 500 also illustrates that carryover effects may negatively impact the following year. Advantageously, identifying project saturation risks during the concept phase enables project managers to begin taking actions to mitigate the risks at an earlier phase when the actions may require significantly less resources. At least in some cases, project managers might be able to make some decisions to avoid the problem altogether rather than mitigating it later on. For example, project managers may decide to cancel and/or postpone some less important projects and/or to allocate more resources to the project having the highest project saturation risk.

Figure 6:
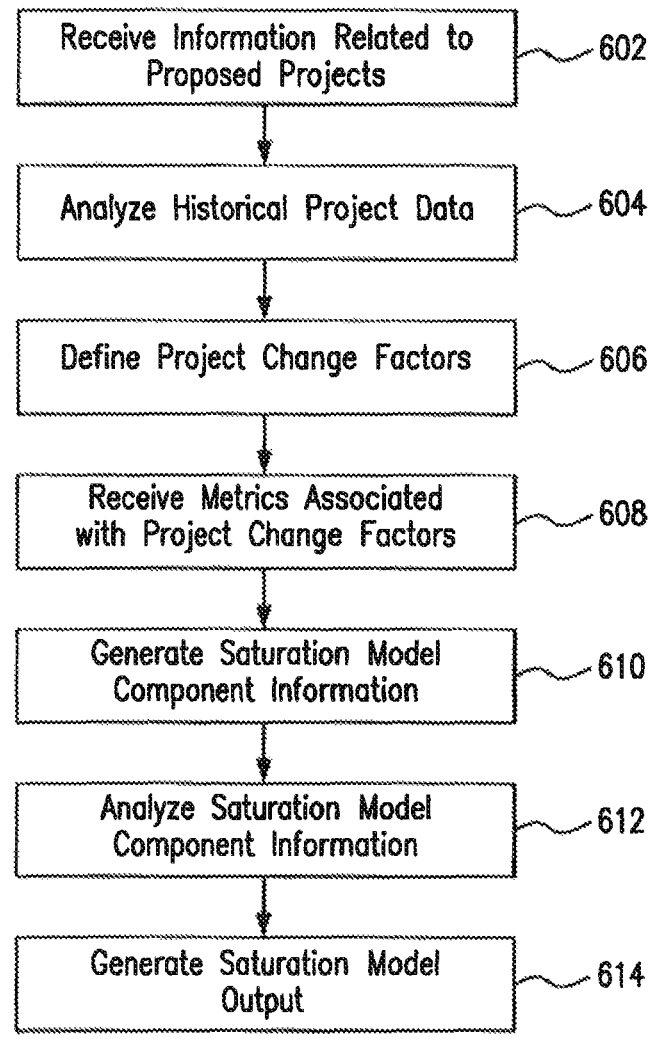
FIG. 6 is a flowchart of operational steps of the project saturation analyzer module of FIG. 1, in accordance with an illustrative embodiment of the present invention.

FIG. 6 is a flowchart of operational steps of the project saturation analyzer module of FIG. 1, in accordance with an illustrative embodiment of the present invention. Before turning to description of FIG. 6, it is noted that the flow diagram in FIG. 6 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more steps may be omitted. In some embodiments, one or more additional steps may be included.

At step 602, project saturation analyzer 106 may receive data associated with proposed projects. Exemplary projects may include, by way of non-limiting example: software development projects, mechanical device development projects, electronic device development projects, and architectural projects. The project information may include, for example, project phases, project schedules, and resource data associated with each project. The project phases and project schedules may include information concerning allotted time or deadlines for the project or project phases. The resource data may include, for example, costs, personnel, or other resources associated with the project or project phase.

Next, at step 604, project saturation analyzer 106 may analyze historical projects data stored in database 110. Historical projects data can include data about past and completed projects of a similar type as the proposed project that is the subject of the analysis. Examples of historical projects data may include at least one profile of at least one historical project team member.

Analysis of historical project data can identify factors that determine a project's complexity. In one embodiment project's complexity can be defined by a plurality of project change factors 202 shown in FIG. 2. Accordingly, at 606, project saturation analyzer 106 may define one or more project change factors. In one embodiment, these project change factors 202 can be directed to at least one of organizational structure 206, utilized business processes 208 and IT and/or other suitable infrastructure 210. At least in some embodiments, project saturation analyzer 106 may generate corresponding project estimation worksheets 200 shown in FIG. 2. Project-estimating worksheet 200 may include a list of questions or other entries for inputting information regarding one or more identified project change factors that may be used in generating project saturation model for the analyzed project.

At 608, project saturation analyzer 106 may receive metrics associated with project change factors determined at step 606. In one embodiment, these metrics may include impact score values or similar scoring values which may be assigned to each of the project changes factors 202. Each impact score may be indicative of the potential effects of corresponding change factors associated with the proposed project on the organization. In one embodiment, project saturation analyzer 106 may obtain project change factor metrics via one or more computing devices 113.

At 610, project saturation analyzer 106 preferably generates a set of saturation model components based on the historical project data, analyzed at step 604, and based on the received plurality of project change factor metrics for each of the proposed projects. In one embodiment, the set of project saturation model components may include, but is not limited to, project demand component 302, compounding component 304, mental change absorption capacity threshold component 308, above threshold component 306 and previous month carry over component 310 described above with reference to FIGS. 3 and 4. It is noted that this step may include project saturation analyzer 106 assigning a weighting factor corresponding to each of the saturation model components 302-310. The saturation model identifies risks associated with a corresponding project. In one embodiment, project saturation analyzer 106 may generate the saturation model by combining the saturation model components for each of the proposed projects.

At 612, project saturation analyzer 106 may analyze saturation model component information. In some embodiments this step may involve determining relationship(s) between saturation model components. It is noted that project saturation analyzer 106 may analyze data associated with saturation model components by a multivariate statistic model or equivalent suitable model well-known in the art. Based on the analysis performed, at 614, project saturation analyzer 106 may generate saturation model output. In one embodiment, this output may include prioritized project list 114 that takes into account analyzed project saturation information. In alternative embodiment, the saturation model output may include a graph depicting the relationship of project saturation and time for a particular project and for a predetermined time period, as shown in FIG. 5. The exemplary bar graph 500 shown in FIG. 5 may be presented to a user (i.e., project manager) via one or more computing devices 113. Forecasting information provided by the output generated at 614 enables the manager of the large project to take action in a timely manner shortly after information about other projects change, thus improving a cumulative strategic development process.

In summary, various embodiments of the present invention are directed to a project saturation model that allows for learning from the historical employee performances and from cumulative planned activities among different projects for a predetermined time period by providing a technique that associates employee saturation risk factors to specific activities and estimates their impact on activity durations and costs. Advantageously, identifying risks associated with mental saturation factors during the concept phase enables project managers to begin taking actions to mitigate the risks at an earlier phase when the actions may require significantly less resources.

As will be appreciated by one skilled in the art, aspects of the present invention may be embodied as a system, method or computer program product. Accordingly, aspects of the present invention may take the form of an entirely software embodiment. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
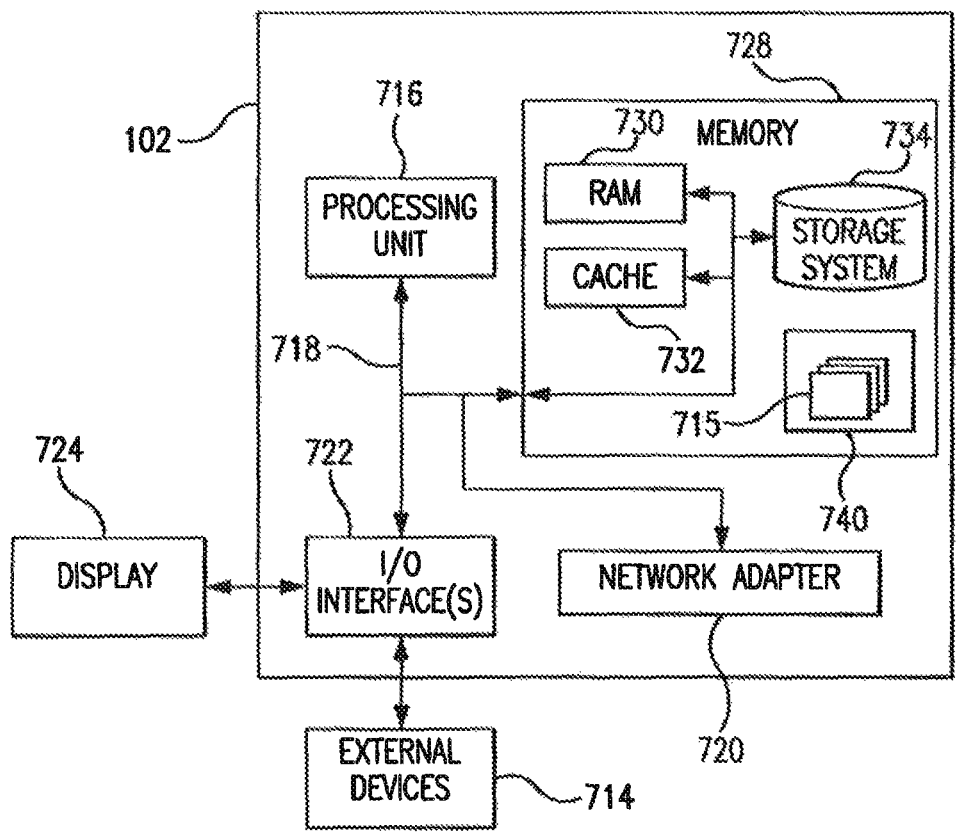
FIG. 7 is a block diagram illustrating a typical integrated project risk management system that may be employed to implement processing functionality described herein, according to some embodiments.

Embodiments of risk management tool may be implemented or executed by integrated project risk management system environments in centralized data center servers comprising one or more computer systems. One such centralized server 102 is illustrated in FIG. 7. In various embodiments, the centralized server 102 may be a server, a mainframe computer system, a workstation, a network computer, a desktop computer, a laptop, or the like.

Centralized server 102 having an integrated project risk management system environment is only one example of a suitable system and is not intended to suggest any limitation as to the scope of use or functionality of embodiments of the invention described herein. Regardless, server 102 is capable of being implemented and/or performing any of the functionality set forth hereinabove.

Server 102 may be described in the general context of computer system-executable instructions, such as program modules, being executed by a computer system. Generally, program modules may include routines, programs, objects, components, logic, data structures, and so on that perform particular tasks or implement particular abstract data types. Server 102 may be practiced in distributed data processing environments where tasks are performed by remote processing devices that are linked through a communications network. In a distributed data processing environment, program modules may be located in both local and remote computer system storage media including memory storage devices.

Server 102 is shown in FIG. 7 in the form of a general-purpose computing device. The components of server 102 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 102 typically includes a variety of computer system readable media. Such media may be any available media that is accessible by server 102, and it includes both volatile and non-volatile media, removable and non-removable media.

System memory 728 can include computer system readable media in the form of volatile memory, such as random access memory (RAM) 730 and/or cache memory 732. Server 102 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 715, such as risk management tool 104 and project saturation analyzer 106, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 715 generally carry out the functions and/or methodologies of embodiments of the invention as described herein.

Server 102 may also communicate with one or more external devices 714 such as a keyboard, a pointing device, a display 724, etc.; one or more devices that enable a user to interact with server 102; and/or any devices (e.g., network card, modem, etc.) that enable server 102 to communicate with one or more other computing devices. Such communication can occur via Input/Output (I/O) interfaces 722. Still yet, server 102 can communicate with one or more networks such as a local area network (LAN), a general wide area network (WAN), and/or a public network (e.g., the Internet) via network adapter 720. As depicted, network adapter 720 communicates with the other components of server 102 via bus 718. It should be understood that although not shown, other hardware and/or software components could be used in conjunction with server 102. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a project saturation model for one or more projects, the method comprising:

analyzing, by a processor, historical project data to define a plurality of project change factors for one or more proposed projects;

receiving, by the processor, a plurality of scoring values associated with the plurality of project change factors for each of the one or more proposed projects;

generating, by the processor, one or more saturation model components based on the historical project data and the received plurality of scoring values for each of the one or more proposed projects and including a predetermined mental change absorption capacity including a threshold value reflective of information absorption capability of personnel and a previous month carry over component determined using historical project carry over data from at least a three month consecutive period; and generating, by the processor, a saturation model by combining the one or more saturation model components for each of the one or more proposed projects, wherein the saturation model identifies risks associated with a corresponding project and generating a bar graph on a computer display representing a relationship of the one or more saturation model components relative to one another extending along a Y-axis, the bar graph including the following delineated saturation model components associated with one or more projects: 1) previous month carry over components; 2) a project demand component; 3) a compounding component; and 4) an above threshold component, wherein a line is drawn along an x-axis that intersects the y-axis of the bar graph indicating a determined mental change absorption capacity threshold such that components below the line are within the determined mental change absorption capacity threshold and components above the line exceed the determined mental change absorption capacity threshold associated with the one or more projects.

2. The computer-implemented method of claim 1, further comprising, prior to said analyzing step, receiving project description, project scope and project schedule for each of the one or more proposed projects.

3. The computer-implemented method of claim 1, wherein the plurality of project change factors are directed to at least one of organizational structure, employed business processes and Information Technology (IT) infrastructure associated with each of the one or more proposed projects.

4. The computer-implemented method of claim 1, wherein generating the saturation model comprises assigning a weighting factor corresponding to each of the one or more saturation model components.

* * * * *